United States Patent
Cannon et al.

(10) Patent No.: US 8,762,743 B2
(45) Date of Patent: *Jun. 24, 2014

(54) ENCRYPTING DATA OBJECTS TO BACK-UP

(75) Inventors: David M. Cannon, Tucson, AZ (US); Avishai H. Hochberg, San Jose, CA (US); James P. Smith, San Jose, CA (US); Mark L. Yakushev, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/484,028

(22) Filed: May 30, 2012

(65) Prior Publication Data

US 2013/0103945 A1  Apr. 25, 2013

Related U.S. Application Data

(63) Continuation of application No. 13/279,017, filed on Oct. 21, 2011.

(51) Int. Cl.
*G06F 12/16* (2006.01)
*H04L 9/28* (2006.01)

(52) U.S. Cl.
USPC .............. 713/193; 380/44; 380/259; 713/189

(58) Field of Classification Search
USPC ............. 380/44, 255, 259; 713/150, 189, 193
See application file for complete search history.

(56) References Cited

U.S. PATENT DOCUMENTS

| | | | |
|---|---|---|---|
| 5,265,164 A | 11/1993 | Matyas et al. | |
| 7,281,006 B2 * | 10/2007 | Hsu et al. | 707/698 |
| 8,041,641 B1 | 10/2011 | Panchbudhe et al. | |
| 8,117,464 B1 * | 2/2012 | Kogelnik | 713/193 |
| 8,155,322 B2 * | 4/2012 | Bellare et al. | 380/286 |
| 8,199,911 B1 * | 6/2012 | Tsaur et al. | 380/44 |
| 8,204,868 B1 * | 6/2012 | Wu et al. | 707/693 |
| 8,401,185 B1 * | 3/2013 | Telang | 380/44 |
| 8,620,877 B2 * | 12/2013 | Smith | 707/692 |

(Continued)

FOREIGN PATENT DOCUMENTS

| | | |
|---|---|---|
| WO | 2010144123 | 12/2010 |
| WO | 2011076463 | 6/2011 |

OTHER PUBLICATIONS

International Search Examination Report, dated Feb. 26, 2013 for Application No. GB1217802.6, pp. 1-6.

(Continued)

*Primary Examiner* — Linglan Edwards
(74) *Attorney, Agent, or Firm* — David W. Victor; Konrad, Raynes, Davda and Victor LLP

(57) ABSTRACT

Provided are a computer program product, system, and method for encrypting data objects to back-up to a server. A client private key is intended to be maintained only by the client. A data object of chunks to store at the server is generated. A first portion of the chunks in the data object is encrypted with the client private key and the first portion of the chunks in the data object encrypted with the client private key are sent to the server to store. A second portion of the chunks in the data object not encrypted with the client private key are sent to the server to store.

12 Claims, 9 Drawing Sheets

Server Object Information

(56) References Cited

U.S. PATENT DOCUMENTS

| | | | |
|---|---|---|---|
| 8,626,723 B2* | 1/2014 | Ben-Shaul et al. | 707/692 |
| 2004/0255136 A1 | 12/2004 | Fadyushin | |
| 2008/0046740 A1* | 2/2008 | Narayanan et al. | 713/176 |
| 2009/0268903 A1 | 10/2009 | Bojinov et al. | |
| 2009/0300369 A1 | 12/2009 | Luetzelberger et al. | |
| 2009/0319772 A1 | 12/2009 | Singh et al. | |
| 2010/0058013 A1 | 3/2010 | Gelson et al. | |
| 2010/0058054 A1* | 3/2010 | Irvine | 713/165 |
| 2010/0161897 A1* | 6/2010 | Lee et al. | 711/112 |
| 2011/0016091 A1 | 1/2011 | Prahlad et al. | |
| 2012/0204024 A1* | 8/2012 | Augenstein et al. | 713/150 |
| 2012/0290837 A1* | 11/2012 | Vion-Dury | 713/167 |
| 2013/0305039 A1* | 11/2013 | Gauda | 713/153 |

OTHER PUBLICATIONS

Wang et al., "Deduplication-Oriented Backup-Data Encryption Method", Journal of Computer Applications, dated Jul. 2010, pp. 1-5, vol. 30 No. 7.

Wang et al., "A Novel Encryption Scheme for Data Deduplication System", School of Computer Science and Engineering, University of Electronic Science and Technology of China, Chengdu, China, 2010, pp. 1-5.

USPTO Patent Application for U.S. Appl. No. 13/279,017, filed Oct. 21, 2011, entitled "Encrypting Data Objects to Back-Up", invented by David M. Cannon et al., pp. 1-44.

Preliminary Amendment dated May 30, 2012 for U.S. Appl. No. 13/279,017, filed Oct. 21, 2011, invented by David M. Cannon et al., pp. 1-11.

Office Action, dated Sep. 19, 2013, for U.S. Appl. No. 13/279,017 (37.272), filed Oct. 21, 2011, entitled, "Encrypting Data Objects to Back-Up", invented by David M. Cannon et al, pp. 1-26.

Response to Office Action, dated Dec. 19, 2013, for U.S. Appl. No. 13/279,017 (37.272), filed Oct. 21, 2011, entitled, "Encrypting Data Objects to Back-Up", invented by David M. Cannon et al, pp. 1-15.

Notice of Allowance, dated Feb. 19, 2014, for U.S. Appl. No. 13/279,017, filed Oct. 21, 2011, entitled, "Encrypting Data Objects to Back-Up", invented by David M. Cannon et al., pp. 1-21.

\* cited by examiner

ENCRYPTING DATA OBJECTS TO BACK-UP

CROSS-REFERENCE TO RELATED APPLICATION

This application is a continuation of U.S. patent application Ser. No. 13/279,017, filed Oct. 21, 2011, which application is incorporated herein by reference in its entirety.

BACKGROUND OF THE INVENTION

1. Field of the Invention

The present invention relates to a computer program product, system, and method for encrypting data objects to back-up to a server.

2. Description of the Related Art

Data deduplication is a data compression technique for eliminating redundant data to improve storage utilization. Deduplication reduces the required storage capacity because only one copy of a unique data unit, also known as a chunk, is stored. Disk based storage systems, such as a storage management server or Virtual Tape Library (VTL), may implement deduplication technology to detect redundant data chunks and reduce duplication by avoiding redundant storage of such chunks.

A deduplication system operates by dividing a file into a series of chunks. The deduplication system determines whether any of the chunks are already stored, and then proceeds to only store those non-redundant chunks. Redundancy may be checked with chunks in the file being stored or chunks already stored in the system.

An object may be divided into chunks using a fingerprinting technique such as Rabin-Karp fingerprinting. Redundant chunks are detected using a hash function, such as MD5 (Message-Digest Algorithm 5) or SHA-1 (Secure Hash Algorithm 1), on each chunk to produce a hash value for the chunks and then compare those hash values against hash values of chunks already stored on the system. Typically the hash values for stored chunks are maintained in an index (deduplication index). A chunk may be uniquely identified by a hash value, or digest, and a chunk size. The hash of a chunk being considered is looked-up in the deduplication index. If an entry is found for that hash value and size, then a redundant chunk is identified, and that chunk in the data object or object can be replaced with a pointer to the matching chunk maintained in storage.

In a client-server software system, the deduplication can be performed at the data source (client), target (server) or on a de-duplication appliance connected to the server. The ability to deduplicate data at the source or at the target offers flexibility in respect to resource utilization and policy management. Typically, the source and target systems have the following data backup protocol:

1. Source identifies data chunk D in file F.
2. Source generates a hash value h(D) for the data chunk D.
3. Source queries the target if the target already has a data chunk with hash value h(D) and size l(D).
4. If the target responds "yes", the source simply notifies the target that chunk with hash h(D) and size l(D) is a part of file F.
5. If the target responds "no", the source sends the data chunk D with its hash h(D) and size l(D) to the target. Target stores D in a storage pool and enters h(D) and l(D) into the de-dup index.
6. If more chunks are to be processed, go to Step 1.

There is a need in the art for improved techniques for protecting data involved in deduplication.

SUMMARY

Provided are a computer program product, system, and method for encrypting data objects to back-up to a server. A client private key is intended to be maintained only by the client. A data object of chunks to store at the server is generated. A first portion of the chunks in the data object is encrypted with the client private key and the first portion of the chunks in the data object encrypted with the client private key are sent to the server to store. A second portion of the chunks in the data object not encrypted with the client private key are sent to the server to store.

In a further embodiment, a server receives indication of a data object of chunks to store for a client. The server receives a first portion of the chunks in the data object encrypted with a client private key and receives a second portion of the chunks in the data object not encrypted with the client private key. The server stores the received first and second portions of the chunks for the data object

DETAILED DESCRIPTION

Encryption can be used to avoid potential security risks in a backup system. These risks include protection of data in flight by encrypting data during transmission between client and server. Protection of data at rest typically involves encryption of data stored by a backup server, especially if the media is removable and could be compromised during transport. Protection of data from misuse of the backup system concerns protection against attackers accessing data via the backup server itself, such as done by a rogue administrator or by an attacker who discovers a user's password and then accesses data stored by the backup system.

To protect against one or more of the above risks in a backup system, different approaches to encryption and key management can be used. In a local key management implementation, data is encrypted by the client during back-up, using a key that is either stored on the client system or managed by the user. The data remains encrypted in flight, at rest and is safe from misuse of the backup system. With system key management, encryption keys are managed by the backup server or an external key management system to protect data at rest, and depending on the implementation can also protect data in flight.

Encrypted data does not deduplicate effectively because encryption eliminates the redundant nature of the data. For example, if two identical files A and B are encrypted using two different keys, the resulting encrypted files A' and B' will not deduplicate against each other.

Described embodiments provide techniques for a client to back-up a data object to a server by encrypting a first portion of chunks in the data object with a client private key. A second portion of the chunks in the data object not encrypted with the client private key may be encrypted with a shared key. The encrypted chunks in the data object may be subject to deduplication, such that the client only sends encrypted chunks to the server that are not already stored at the server. In certain embodiments, the server stores encrypted chunks for deduplication, where certain of the chunks are encrypted with the shared key and other of the chunks are encrypted with the private key of clients backing-up data objects to the server. Because all clients may use the shared key to encrypt the chunks in their data objects, those chunks stored at the server encrypted with the shared key are more likely to be used in deduplication than chunks encrypted with client private keys. However, the use of client private keys to encrypt chunks in data objects increases the security of data objects by preventing anyone other than the client that backed-up the data object, and encrypted the first portion of the chunks with their private key, from accessing the data object because private keys are intended to be maintained only by the client for which the key was generated.

Figure 1:
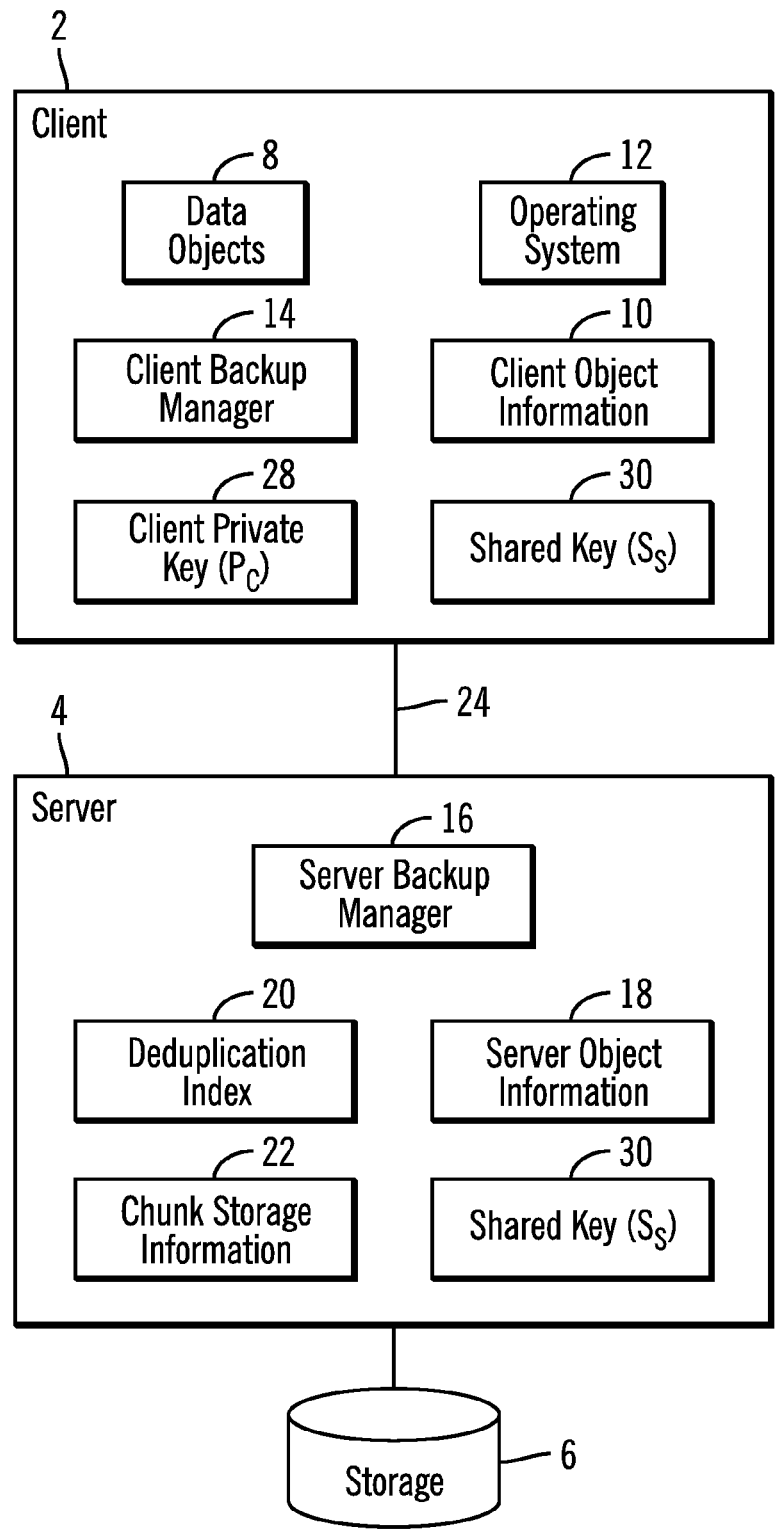
FIG. 1 illustrates a computing environment in which embodiments are implemented.

FIG. 1 illustrates an embodiment of a computing environment having a client 2 and server 4 for backing up data in the client 2 to storage 6. The client maintains data objects 8, such as files or objects, and maintains client object information 10 having metadata for each data object, including an ordered list of chunks of data assigned to each data object. The client 2 includes an operating system 12 to generate and maintain data objects 8 at the client 2, which data objects 8 may be stored in local storage at the client 2. To back-up data objects 8 at the client 2, a client backup manager 14 transfers chunks in the data objects 8 to a server backup manager 16 in the server 4. In certain embodiments, the client 2 only sends chunks that are not already stored at the server 4 as part of deduplication.

The server backup manager 16 maintains server object information 18 on chunks assigned to data objects provided from one or more clients 2. Further, the server backup manager 16 may maintain a deduplication index 20 to store only one copy of a chunk in the storage 6, although one chunk may be included in multiple data objects. The server 4 may further maintain chunk storage information 22 indicating a location in the storage 6 of each chunk included in data objects being backed up at the storage 6.

The client 2 and server 4 components communicate over a connection 24. In one embodiment, the client 2 and server 4 may comprise separate computer systems and the link 24 may comprise a network, such as a local area network (LAN), storage area network (SAN), wide area network (WAN), etc. In further embodiments, the client 2 and server 4 components may be implemented on a single computer system platform, and the link 24 may comprise communication over a bus or via memory.

In certain embodiments, the client 2 maintains a client private key ($P_c$) 28 intended to be known only to the client 2 that is used to encrypt a first portion of chunks of the data object 8, such as the first chunk, sent to the server 4 to back-up. The server 4 may share a shared key ($S_s$) 30 with the client 2 to use to encrypt chunks of the data objects sent between the client 2 and server 4 as part of backup and restore operations. The server may share the shared key 30 with multiple clients to use to encrypt chunks. The server 4 may store encrypted chunks in the storage 6 encrypted with the shared key ($S_s$) to increase the security of chunks stored at the server 4. In an alternative embodiment, the server 4 may store the chunks of data objects from clients 2 unencrypted and encrypt with the shared key ($S_s$) when sending to the client 2.

The client 28 and server 30 keys may comprise cryptographic keys known in the art, such as symmetric keys produced by a symmetric key algorithm. The shared key 30 used by the clients 2 and server 4 may comprise the same symmetric key. Alternatively, the keys 28 and 30 may be produced according to public key cryptography using an asymmetric key technology. For instance, the server 4 may maintain a private key and share the public key with clients 2 that the clients 2 may use to encrypt chunks sent to the server 4 that may be decrypted with the server private key. The server may send chunks to the clients 2 encrypted with the server private key that can only be decrypted by the server public key held by the clients 2. Other key encryption techniques known in the art may be used for the client private key 28 and the shared key 30. In a yet further embodiment, the shared key 30 may not be known to the server.

The storage 6 may comprise storage media implemented in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc.

The client 14 and server 16 backup managers may comprise software programs in a memory executed by a processor. In an alternative embodiment, the some portion or all of the programs 14 and 16 may be implemented in a hardware component, such as a dedicated integrated circuit, e.g., Application Specific Integrated Circuit (ASIC), expansion card, etc.

Although the client 14 and server 16 backup managers are shown as as separate components, in alternative implementations the functions performed by the client 14 and server 16 backup managers may be implemented in a single program component in a single computer system or in more than two program components in more than two computer devices.

Figure 2:
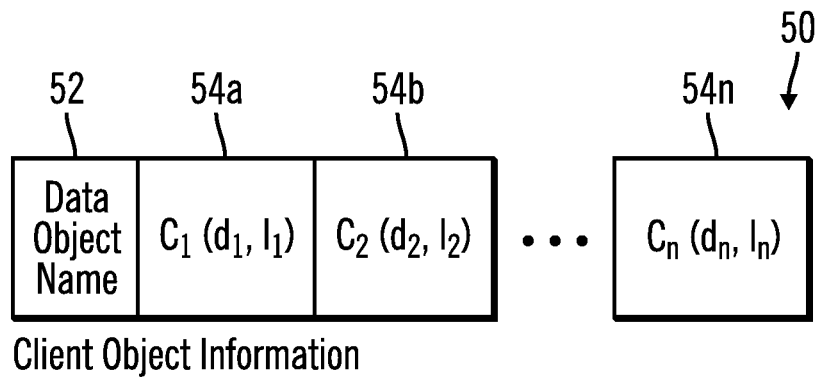
FIG. 2 illustrates an embodiment of client object information.

FIG. 2 illustrates an embodiment of an instance of client object information 50 for one data object maintained in the client object information 10. The client object information 50 for one data object includes a data object name 52 assigned to the data object by the client 2, such as a unique identifier name and one or more chunk identifiers ($C_i$) 54a, 54b . . . 54n of chunks assigned to the client data object 52. The actual chunks may be of variable length, i.e., have the same or different lengths, or of a fixed length. The object information 50 may maintain an ordered list of the chunk identifiers ($C_1 \ldots C_n$) indicating the order 1 . . . n in which the chunks appear in the data object.

In one embodiment, the chunk identifier ($C_i$) is calculated by processing the chunk to generate a unique value for the chunk. In this way, the object information 50 provides metadata on the chunks included in the object, such as digest and length, but not the actual data. The digest (d) may be calculated by processing the chunk to generate a unique value for the chunk. In one embodiment, the digest may comprise a cryptographic digest, such as MD5 (Message-Digest Algorithm 5) or SHA-1 (Secure Hash Algorithm 1), which calculates cryptographic hashes of each chunk in the data object. The chunk identifier ($C_i$) may comprise the digest ($d_i$) alone or a combination of the digest ($d_i$) and a length ($l_i$) of the chunk identified by the chunk identifier ($C_i$), or in combination with further information.

In certain embodiment, the digest ($d_i$) used for the chunk identifier ($C_i$) may be calculated from the chunk encrypted with the client private key ($P_c$) 28 or shared key ($S_S$) 30, and the server 4 may store the encrypted chunk for added protection. Further, the length ($l_i$) used to identify the chunk in certain embodiments may comprise the length of the encrypted chunk. Both the client 2 and the server 4 may use the chunk identifier ($C_i$) calculated from the encrypted chunk to identify the chunk. Alternatively, the digest used for the chunk identifier may be calculated from the unencrypted chunk.

Figure 3:
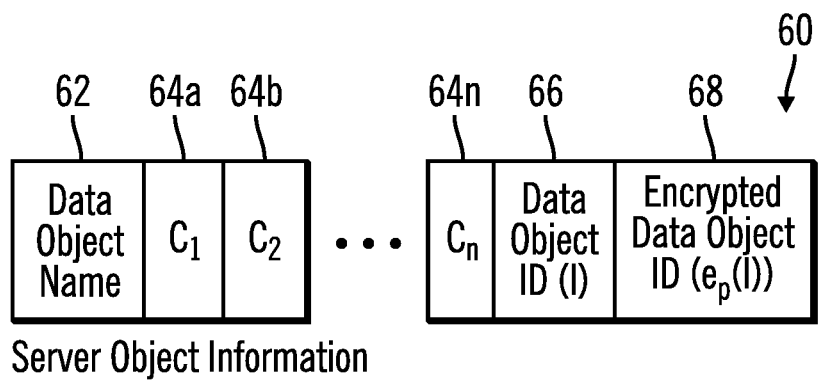
FIG. 3 illustrates an embodiment of server object information.

FIG. 3 illustrates an embodiment of server object information 60 for one data object maintained at the server object information 18. The server object information 60 for one data object includes the client data object name 62 assigned to the data object by the client 2, such as the data object name 52 used in the client object information 50, and one or more chunk identifiers ($C_i$) 64a, 64b . . . 64n of chunks assigned to the client data object 52, which comprise the same chunk identifiers 54a, 54b . . . 54n used by the client 2 to identify the chunks. The chunk identifiers 64a, 64b . . . 64n may be calculated from the encrypted chunks in the data object, encrypted with the client private key 28 or shared key 30. The server object information 60 further includes a unique data object identifier (I) 66 assigned by the server to the data object, such as a random number and a copy of the data object identifier encrypted with the client private key ($P_c$) 28, where I' is the encrypted identifier ($e_p(I)$) 68 calculated by encrypting the identifier (I) 66 with the client private key 28.

Figure 4:
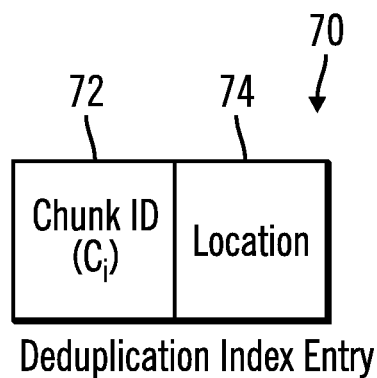
FIG. 4 illustrates an embodiment of a deduplication index entry.

FIG. 4 illustrates an embodiment of a deduplication index entry 70 maintained by the server backup manager 16 for each chunk stored in the storage 6, which may comprise an encrypted chunk. The index entry 70 includes a chunk identifier (ID) 72 of the chunk in storage 6, such as the chunk identifier 54a . . . 54n, 64a . . . 64n used by the clients 2 and server 4, and a location 74 indicating the storage 6 having the chunk 72. When determining whether to transmit a copy of the chunk to the server 4, the client 2 may provide the chunk identifier ($C_i$) to the server 4, and the server 4 may determine whether one entry 70 in the deduplication index 20 has a chunk identifier ($C_i$) matching the chunk identifier of the chunk the client 2 is attempting to send to the server 4 as part of a backup operation. If there is no match the client 2 sends a full copy of the chunk in the data object 8 to back-up to the server 4 to store in storage 6. Otherwise, if the deduplication index 20 has a matching copy of the chunk identifier ($C_i$), then the client backup manager 14 need not transfer a full copy of the chunk. Instead, the client backup manager 14 may transfer just the chunk identifier ($C_i$).

In this way, the subcomponents of an object, referred to herein as chunks, are stored separately from the objects or files in which they are included. A chunk may comprise an extent of tracks, a block of data or any other definable subunit of data that may be assigned to objects. An object may comprise any grouping of data units, such as a file, object, database, etc.

Figure 5A:
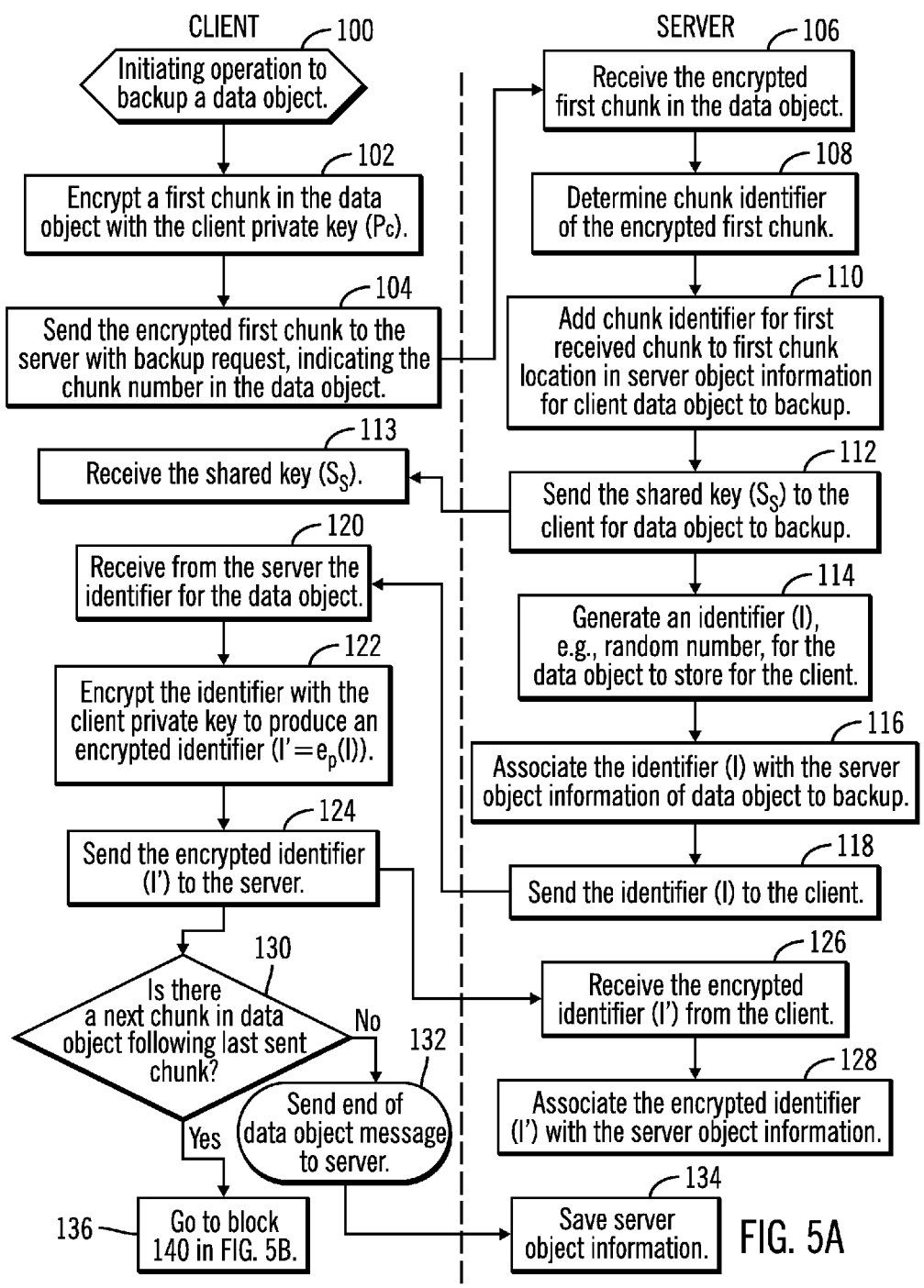
FIGS. 5a and 5b illustrates an embodiment of operations to back-up a data object.
Figure 5B:
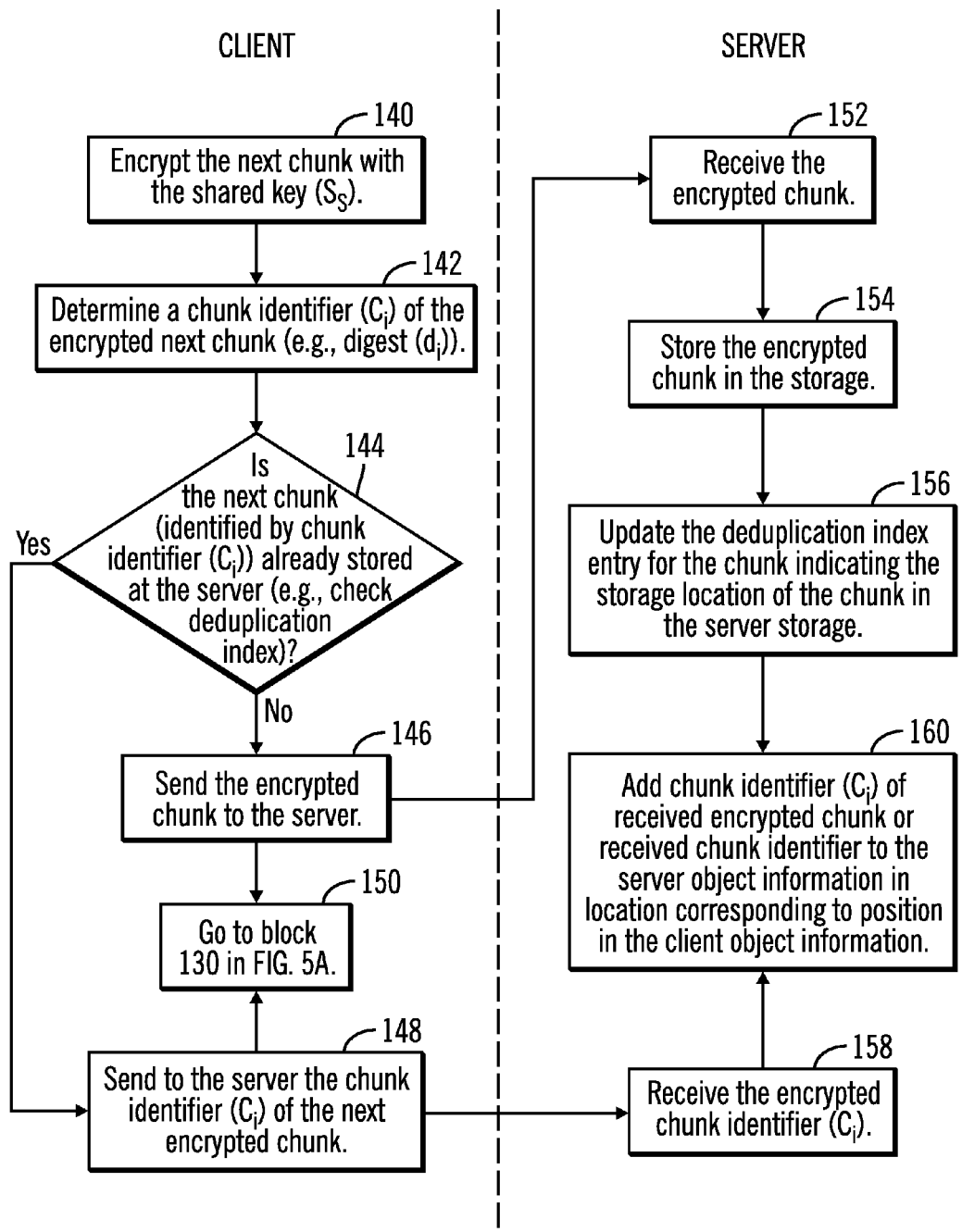

FIGS. 5a-5b illustrate an embodiment of operations performed by the client backup manager 14 and server backup manager 16 to back-up data objects at the client 2 to the server 4. Upon initiating an operation (at block 100) to back-up a data object 8, the client backup manager 14 encrypts (at block 102) a first chunk ($C_1$) in the data object with the client private key ($P_c$) and sends (at block 104) the encrypted first chunk ($e_p(C_1)$) to the server 4 with a backup request, indicating the first chunk number in the data object. In certain embodiments, when sending encrypted chunks to the server to back-up, the client backup manager 14 may indicate the chunk number or order of the chunk in the data object 50, or the server backup manager 18 may determine the number of the received chunk in the data object from metadata for the chunk or based on the order in which the chunk is received. In certain embodiments, the client backup manager 14 may determine if the server 4 already stores a chunk matching the first chunk encrypted with the client private key and, if so, only send an identifier of the encrypted first chunk ($e_p(C_1)$), instead of the first chunk to provide for deduplication of the chunks encrypted with the client private key. When sending the backup request, the client backup manager 14 may send a copy of the client object information 50 indicating the encrypted chunks 54a, 54b . . . 54n that will be sent.

Upon receiving (at block 106) the encrypted first chunk in the data object 50, the server backup manager 16 determines (at block 108) the chunk identifier ($C_i$) of the encrypted first chunk ($e_p(C_1)$). In one embodiment, the client backup manager 14 may provide the chunk identifier or the chunk identifier may be calculated by applying a digest hash or function to the encrypted first chunk 54a. The server backup manager 16 adds (at block 110) the chunk identifier ($C_1$) for the first received chunk ($e_p(C_1)$) to the first chunk location 64a in the server object information 60 for the client data object to back-up. Alternatively, the server backup manager 16 may receive from the client 2 the client object information 50 with the chunk identifiers based on the encrypted chunks and use that information to create the server object information 60. The server backup manager 16 sends (at block 112) the shared key ($S_S$) 30 to the client 2, which receives (at block 113) the shared key 30 to use to encrypt chunks to back-up in the data object. Alternatively, the client 2 may already have the shared key 30 from previous operations. The server backup manager 16 generates (at block 114) an identifier (I), such as a random number, for the data object to back-up, and associates (at block 116) the data object identifier (I) with the server object information 60 in field 66. The server backup manager 16 sends (at block 118) the identifier (I) 66 to the client 2.

Upon receiving (at block 120) the data object identifier (I) 66, the client backup program 14 encrypts (at block 122) the identifier (I) with the client private key 28 to produce an encrypted identifier ($I'=e_p(I)$) and sends (at block 124) the encrypted identifier (I') to the server 4. Upon receiving (at block 126) the encrypted identifier (I'), the server backup manager 16 associates (at block 128) the encrypted identifier (I') with the server object information 60 by including the identifier (I') or a pointer to I' in field 68.

In alternative embodiments, the server backup program 16 may generate an identifier (I) for the client 2 to use for all data objects from the client 2, so that when the client 2 is able to decrypt the encrypted identifier (I') for the client, then that client could restore any data object associated with the client identified by identifier I generated for the client. Thus, there may be a unique identifier (I) for each data object for a client or one identifier for a client associated with all data objects originating from the client.

If (at block 130) there is no next chunk in the data object 50 following the last sent chunk, such as the first or subsequent sent chunk, then the client backup manager 14 sends (at block 132) an end of data object message to the server 4. Otherwise, if there are further chunks in the client data object 50 to send, then the client backup manager 14 proceeds (at block 136) to block 140 in FIG. 5b to encrypt the next chunk 54b . . . 54n with the shared key ($S_S$). The client backup manager 14 determines (at block 142) a chunk identifier ($C_i$) of the encrypted next chunk, such as a digest $d_i$. The client backup manager 14 performs deduplication so that only chunks not already at the server storage 6 are sent. The client backup manager 14 determines (at block 144) whether the next encrypted chunk (identified by chunk identifier ($C_i$)) is already stored at the server 4. This may be determined from querying a deduplication index 20 to determine if there is a deduplication index entry 70 having a chunk identifier 72 matching that of the next encrypted chunk or by the client backup manager 14 inquiring with the server backup manager 16 or a deduplication device as to whether the encrypted chunk needs to be sent (e.g., the chunk identifier of the chunk to send is not in the deduplication index 20). In certain embodiments, the chunk identifiers 72 in the deduplication index entries 70 may be determined or calculated from the encrypted chunk.

If (at block 144) the next chunk ($C_i$) to send is not already stored at the server 4, then the client backup manager 14 sends (at block 146) the encrypted chunk to the server 4. If (at block 144) the next chunk to send is already stored at the server, then the client backup manager 14 sends (at block 148) the chunk identifier ($C_i$) of the next encrypted chunk in the data object. After sending (at block 146 or 148) the chunk or the chunk identifier, control proceeds (at block 150) back to block 130 in FIG. 5a to determine if there are any further chunks in the data object to process and send to the server 4.

Upon receiving (at block 152) the encrypted chunk, the server backup manager 16 stores (at block 154) the encrypted chunk in the storage 6 and updates (at block 156) the deduplication index 20 entry 70 for the chunk indicating the storage location of the chunk in the server storage 6. Upon receiving (at block 158) the encrypted chunk identifier ($C_i$) or after updating the deduplication index (at block 156), the server backup manager 16 adds (at block 160) chunk identifier ($C_i$) of the received encrypted chunk (at block 152) or the received chunk identifier (at block 158) to the server object information 60 in a location corresponding to the position of the chunk in the client object information 50. In an alternative embodiment, the operation at block 160 is not performed if the client backup manager 14 sent all the chunk identifier ($C_i$) information in the client object information 50 to the server 14 with the backup request. Further, the client 2 may send the order information of the sent chunks and identifiers in the data object.

With the described embodiments of FIGS. 5a and 5b, the client 2 encrypts a first portion of chunks in the data object to back-up with a client private key. A second portion of the chunks in the data object to back-up that are not encrypted with the client private key 28 may be encrypted with a shared key or transmitted unencrypted. In one embodiment, the first portion of the chunks encrypted with the client private key and initially sent to the server 4 may comprise the first chunk in the data object and the second portion of the chunks comprises all chunks in the data object following the first chunk. In an alternative embodiment, the first portion of the chunks encrypted with the client private key 28 may comprise multiple chunks in the data object, such as consecutive and/or non-consecutive chunks, and the second portion of chunks comprises all chunks not encrypted with he client shared key 28. Alternatively, the first portion of chunks may comprise a part of one or more chunks, such as the chunk metadata, specified blocks in a chunk, etc. In certain embodiments, there may be a configuration setting of the client 14 and server 16 backup managers that indicates the first portion of chunks that would be encrypted with the client private key 28.

The server backup manager 16 may back-up data objects from multiple clients 4. In such case, each client 4 may use their own private key to encrypt a first portion of the chunks in the data object and multiple clients may use the same shared key to encrypt the second portion of the chunks in the data object. Further, there may be multiple shared keys, where different keys are shared among different groups of clients, such as based on a project or department to which the client is assigned, which further restricts access to data objects to sub-groups of clients within a larger group.

Encrypting chunks with the client private key 28, intended to be accessible only to the client, increases the security of the data object because others are unlikely to be able to decrypt the first portion of the chunks, thus unable to access the entire data object. However, the first portion of the chunks are less likely to be available for deduplication because other clients are unlikely to produce an encrypted chunk matching a chunk encrypted with another client's private key. Although matches of chunks encrypted with the client private key are more likely for chunks that belong to the same client 2. The second portion of chunks including chunks encrypted with the shared key are likely to be repeated in data objects at different clients because different clients with the same data would use the same shared key, thus producing the same encrypted chunk. Thus, chunks encrypted with the shared key will have similar deduplication benefits as with unencrypted chunks.

Increasing data object security by increasing the number of chunks in the first portion encrypted with the client private key has the effect of reducing the number of chunks in the second portion available for deduplication, thus reducing the ability to conserve storage space 6 and reduce network traffic through deduplication.

Figure 6:
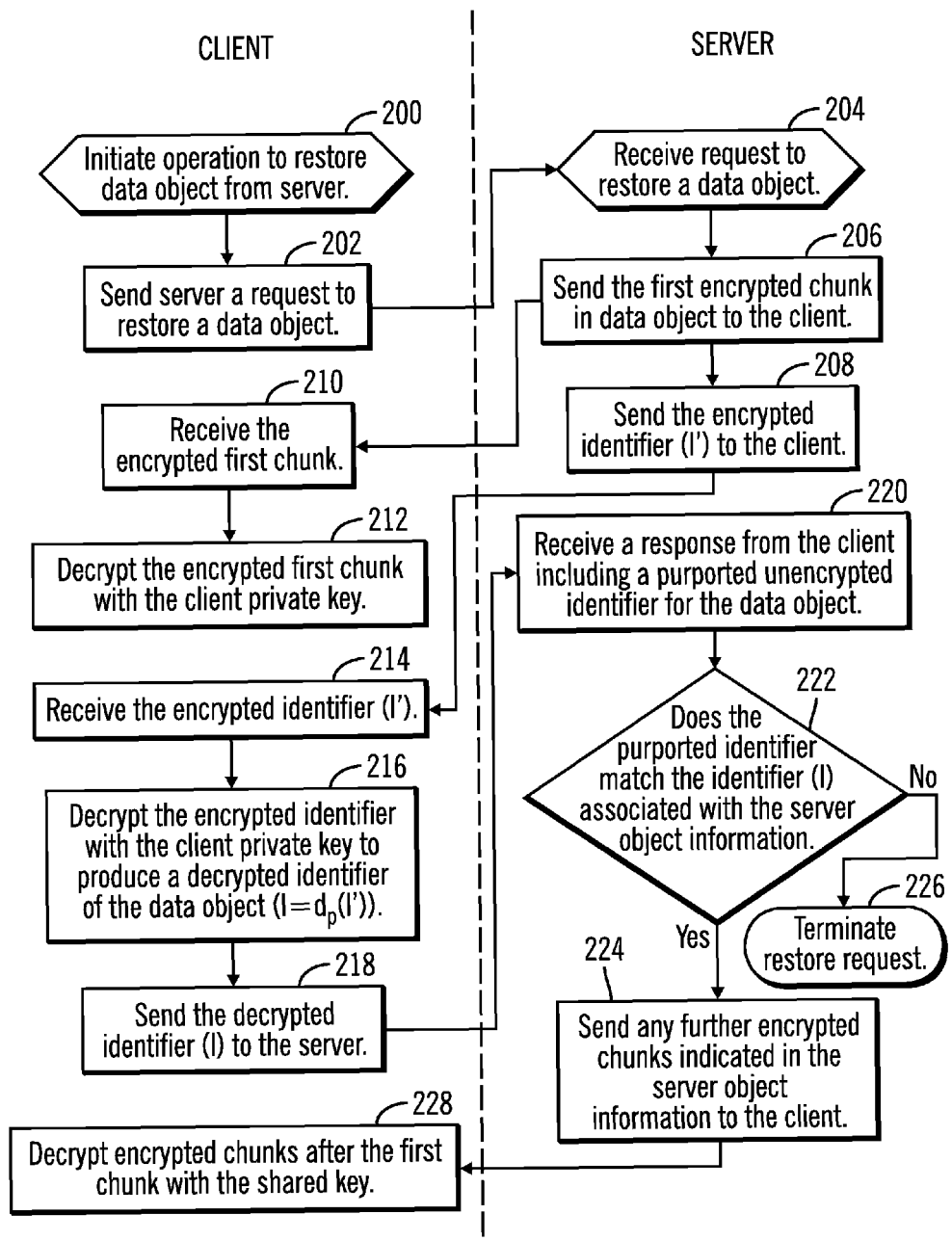
FIG. 6 illustrates an embodiment of operations to restore a data object.

FIG. 6 illustrates an embodiment of operations performed by the client 14 and server 16 backup managers to restore a data object stored at the server 4. Upon (at block 200) the client backup manager 14 initiating an operation to restore the data object 50, the client backup manager 14 sends (at block 202) a request to restore a data object, which would include the data object name 52. Upon receiving (at block 204) the restore request, the server backup manager 16 sends (at block 206) the first encrypted chunk 64a (or encrypted first portion of chunks) in the data object 60 and sends (at block 208) the encrypted identifier (I') 68 to the client 2. Upon receiving (at block 210) the encrypted first chunk, the client backup manager 14 decrypts (at block 212) the encrypted first chunk ($e_p(C_1)$) with the client private key 28 to produce the unencrypted first chunk 54a. Upon receiving (at block 214) the encrypted identifier (I'), the client backup manager 14 decrypts (at block 216) the encrypted identifier (I') with the client private key 28 to produce a decrypted identifier of the data object ($I=d_p(I')$). The decrypted identifier (I) is sent (at block 218) to the server 4.

Upon receiving (at block 220) a response from the client including a purported unencrypted identifier for the data object (e.g., PI), the server backup manager 16 determines (at block 222) whether the purported identifier (PI) matches the identifier (I) 66 associated with the data object 60 (FIG. 3) to restore. If there is a match, then the server backup manager 16 sends any further encrypted chunks, e.g., $C_2 \ldots C_n$, indicated in the server object information 60, encrypted with the shared key 30, to the client 4. If there is no match, then the server backup manager 16 terminates (at block 226) the restore request. The server backup manager 16 may send a message to the client 2 that the restore operation is terminated due to authorization failure. Upon receiving (at block 228) additional encrypted chunks following the first chunk (or first portion of chunks), the client backup manager 14 decrypts (at block 228) the chunks with the shared key 30.

In an alternative embodiment, the operations at blocks 206, 210, and 212 may only be performed after the client purported identifier is validated at block 222. In this way, the first encrypted chunk is not sent, received and decrypted until the client sends an unencrypted identifier (I) that matches the identifier associated with the server object information.

If the server 4 backs-up data objects from multiple clients, then the server object information 60 would be associated with a particular client through the encrypted data object identifier (I') 68, encrypted with the client specific private key. In this way, clients can only restore data objects for which they provided the encrypted data object identifier (I'), during the backup operation of FIGS. 5a and 5b, because other clients should not have the client private key 28 used to encrypt the identifier (I') to be able to present the matching data object identifier (I) and receive further chunks to restore (at block 224).

Figure 7:
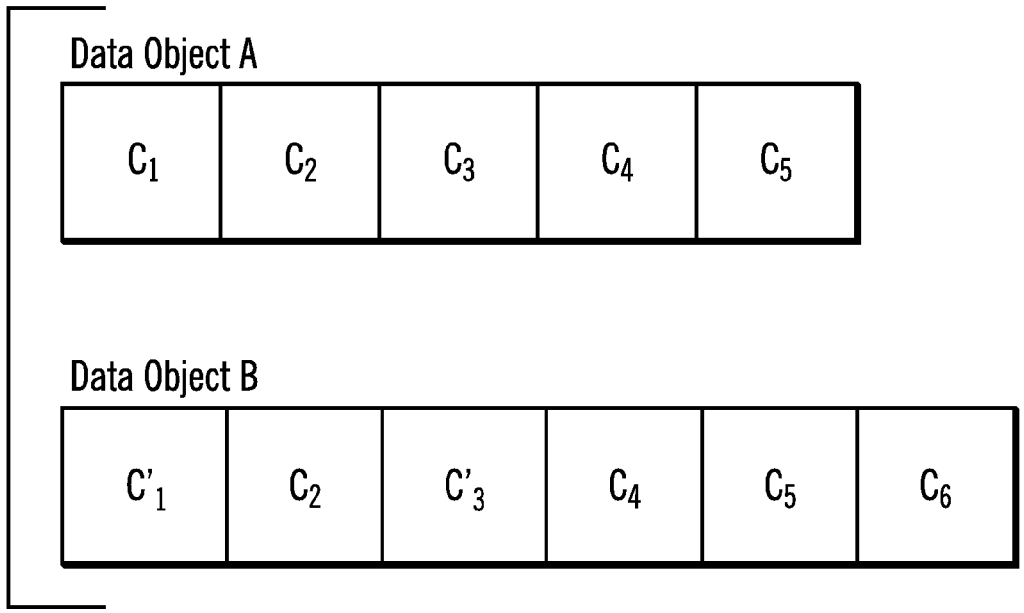
FIG. 7 illustrates an example of data objects and their chunks.
Figure 8:
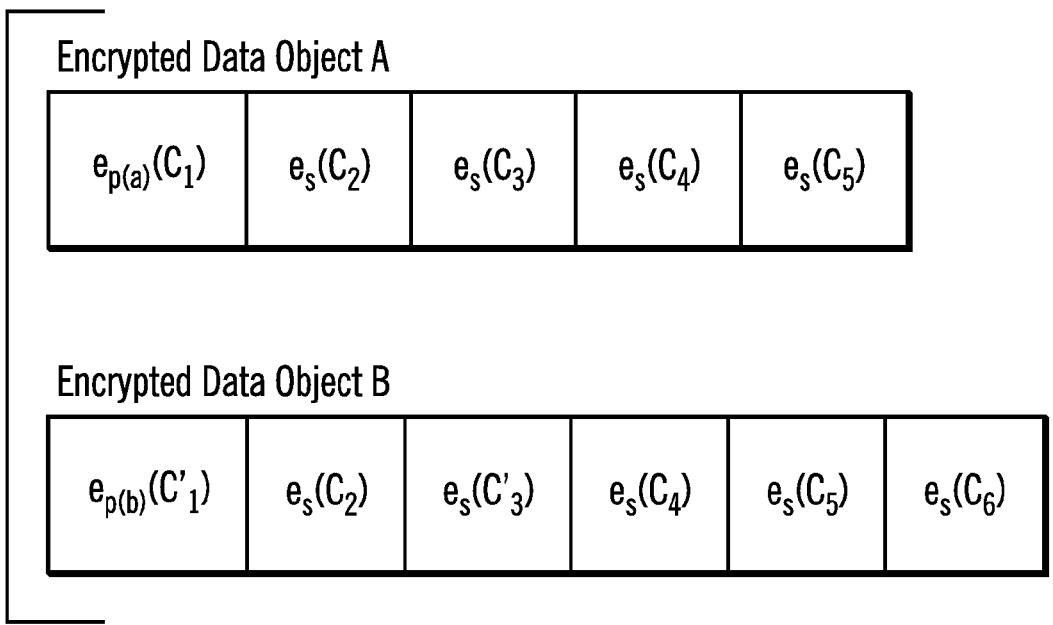
FIG. 8 illustrates an example of encrypted chunks in the data objects of FIG. 7.

FIG. 7 illustrates an example of data object A and data object B from different clients A and B, respectively, that back-up data objects to the server 4. The data objects A and B have some common unencrypted chunks, such as chunks $C_2$, $C_4$, and $C_5$. When data object A is sent to the backup server, the first chunk $C_1$ is encrypted with the client A private key (p(a)) to produce, as shown in FIG. 8, encrypted chunk $e_{p(a)}$ ($C_1$) and the following chunks $C_2$, $C_3$, $C_4$, and $C_5$ are encrypted with the shared key 30 (S) producing, as shown in FIG. 8, encrypted chunks $e_s(C_2)$, $e_s(C_3)$, $e_s(C_4)$, and $e_s(C_5)$. The server would further maintain an identifier ($I_A$) of the data object A and an encrypted identifier ($I'_A$), encrypted with client A private key p(a).

The first chunk $C'_1$ of data object B is encrypted with client B's private key ($p_{(b)}$) and the following chunks $C_2$, $C'_3$, $C_4$, $C_5$, and $C_6$ are encrypted with the shared key (S) 30 to produce the encrypted chunks for data object B shown in FIG. 8 as encrypted chunks $e_{p(b)}(C'_1)$, $e_s(C_2)$, $e_s(C'_3)$, $e_s(C_4)$, $e_s(C_5)$, and $e_s(C_6)$. However, because the encrypted version of chunks $e_s(C_2)$, $e_s(C_4)$, $e_s(C_5)$ are already on the server 4 as a result of backing-up encrypted data object A, using deduplication, these encrypted chunks for data object B do not need to be resent to the server 4. The server 4 would further maintain an identifier ($I_B$) of the data object B and an encrypted identifier ($I'_B$), encrypted with client B private key (p(b)).

If client B tries to restore data object A, the server 4 would send the encrypted identifier for data object A ($I'_A$), which client B cannot decrypt because it does not have client A's private key. Thus, any attempted restore by client B of client A's data object would fail.

The described embodiments provide encryption for back-up related operations with respect to backup data. However, in further embodiments, the discussed operations for transferring chunks and data may apply to data transfer operations for other types of data, such as archival data and space managed Hierarchical Storage Management (HSM) data.

Described embodiments provide techniques to encrypt and protect data objects being backed-up and restored by using a private key to encrypt a first portion of the chunks in a data object, but leaving a second portion of the chunks not encrypted by the client private key so that they are available for deduplication with other client chunks. In further embodiments, the server may maintain a unique identifier generated for a particular client to associated with a data object sent by that client.

Cloud Computing Embodiments

The computing environment of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 9-11. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
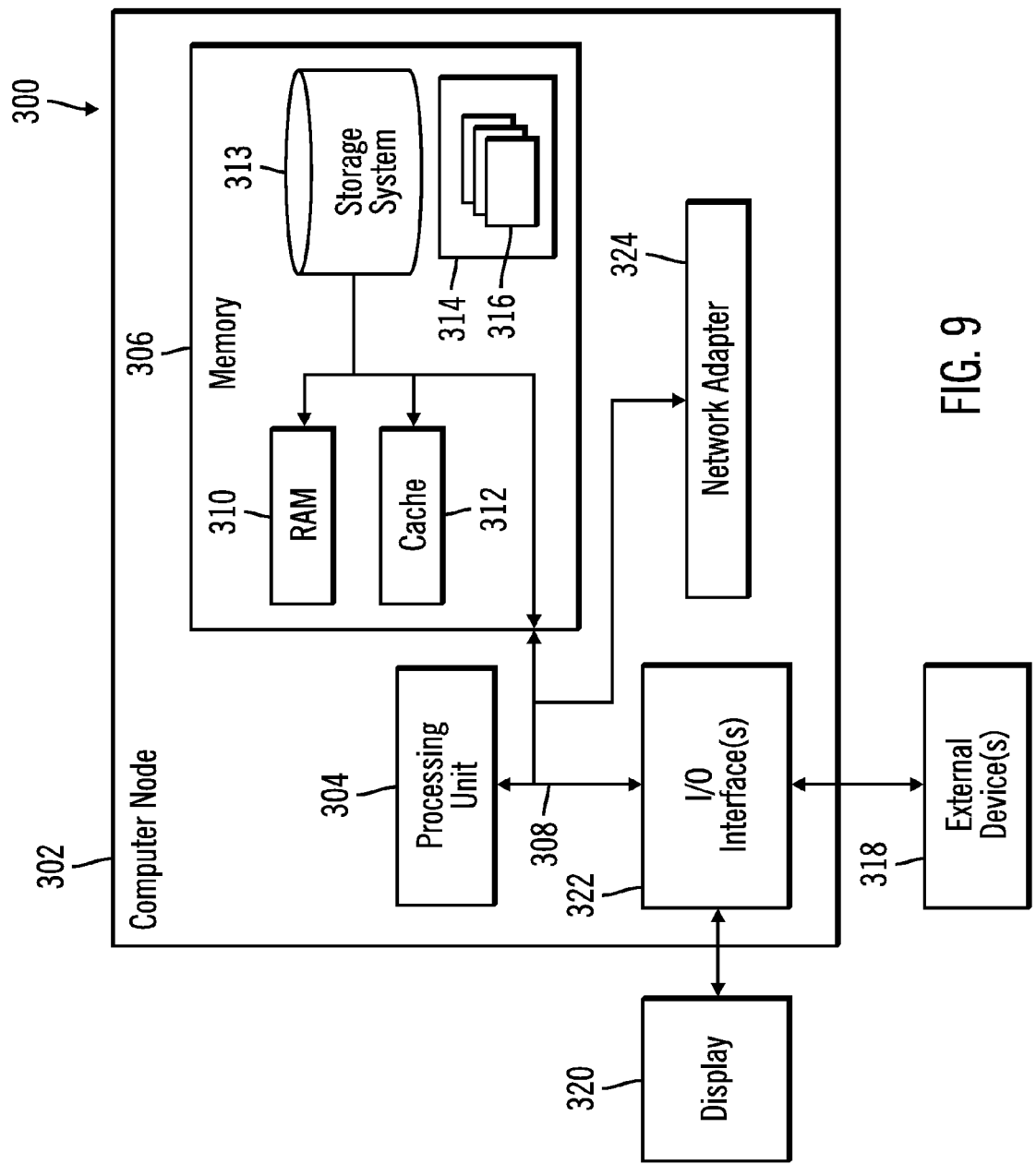
FIG. 9 illustrates an implementation of a node in the network computing embodiment.

FIG. 9 illustrates an example of a cloud computing node 300 which may comprise an implementation of the client 2 and server 4 systems. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

In cloud computing node 300 there is a computer system/server 302, which is operational with numerous other general purpose or special purpose computing system environments or configurations. Examples of well-known computing systems, environments, and/or configurations that may be suitable for use with computer system/server 302 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 302 in cloud computing node 300 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 10:
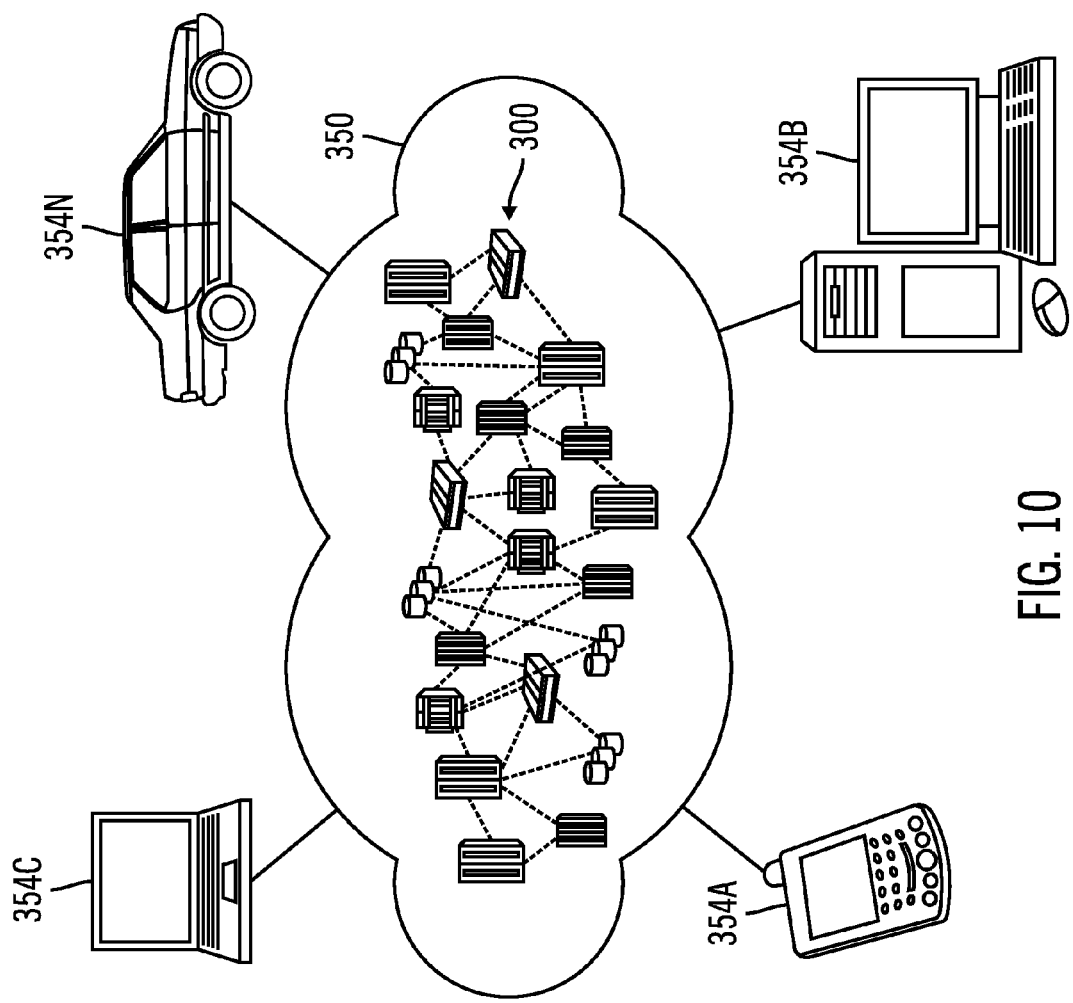
FIG. 10 illustrates an embodiment of a cloud computing environment.

Referring now to FIG. 10, illustrative cloud computing environment 350 is depicted. As shown, cloud computing environment 350 comprises one or more cloud computing nodes 300 with which local computing devices used by cloud consumers, such as, for example, personal digital assistant (PDA) or cellular telephone 354A, desktop computer 354B, laptop computer 354C, and/or automobile computer system 354N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 10 are intended to be illustrative only and that computing nodes 300 and cloud computing environment 350 can communicate with any type of computerized device over any type of network and/or network addressable connection (e.g., using a web browser).

Further, FIG. 10 shows a single cloud. However, certain cloud embodiments may provide a deployment model including a separate "Backup" or "Data Protection" cloud, in addition to the cloud having the customer/production data. Providing a separate and distinct additional cloud as the data protection cloud in order to separate whatever primary cloud model (provide, community, hybrid, etc) from the data protection cloud prevents a single point of failure and provides a greater degree of protection of the customer data in the separate backup cloud.

Figure 11:
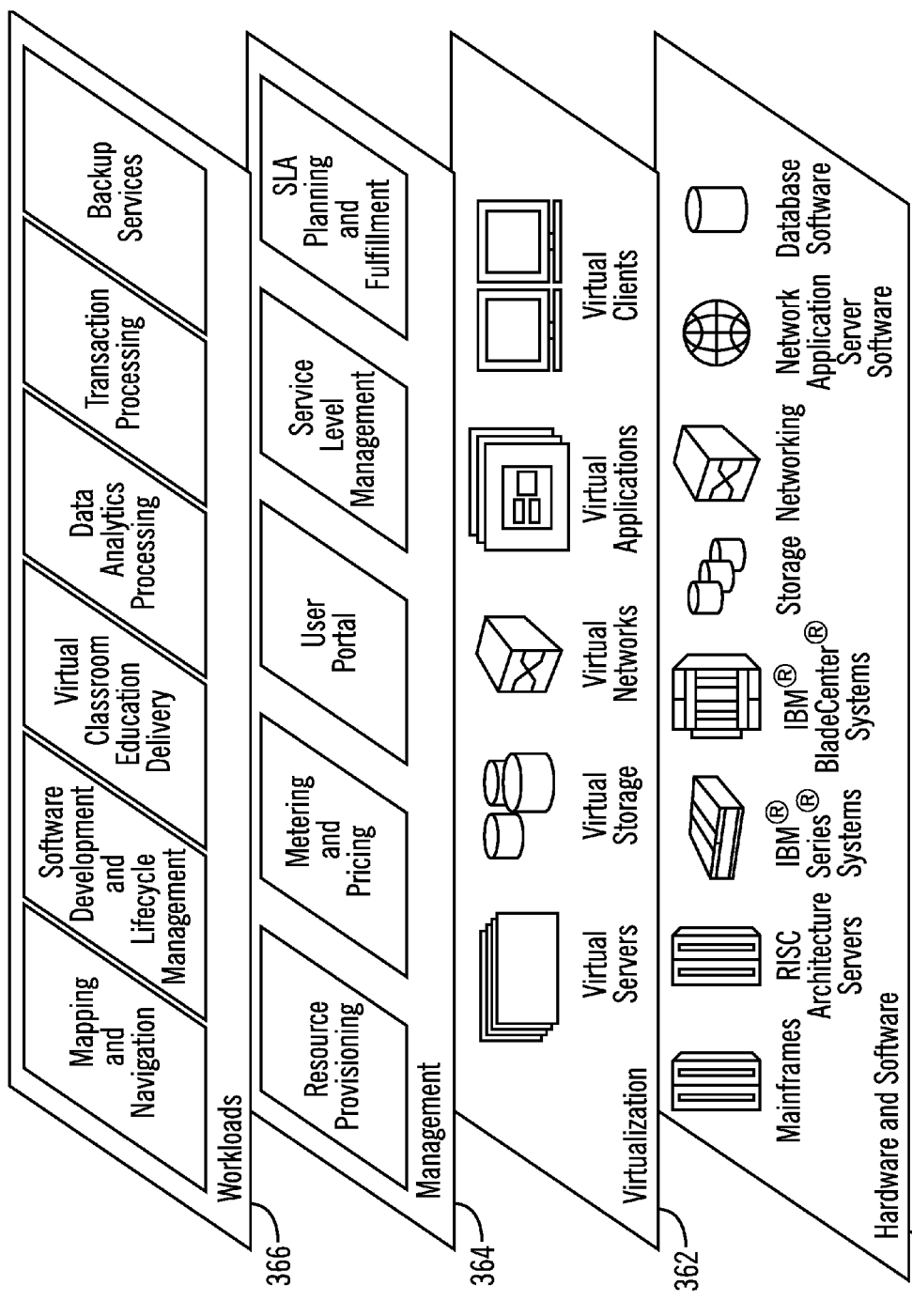
FIG. 11 illustrates an embodiment of abstraction model layers of a cloud computing environment.

Referring now to FIG. 11, a set of functional abstraction layers provided by cloud computing environment 350 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 360 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2®, database software. (IBM, zSeries, pSeries, xSeries, BladeCenter, WebSphere, and DB2 are trademarks of International Business Machines Corporation registered in many jurisdictions worldwide).

Virtualization layer 362 provides an abstraction layer from which the following examples of virtual entities may be provided: virtual servers; virtual storage; virtual networks, including virtual private networks; virtual applications and operating systems; and virtual clients.

In one example, management layer 364 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 366 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the client 14 and server 16 backup manager services, such as described with respect to FIGS. 1-4, 5a, 5b, and 6 above.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5a, 5b, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
   maintaining, by a client, a client private key in a computer readable storage medium;
   generating a data object comprising a plurality of chunks to store at a server, wherein the server stores the chunks in a storage;
   encrypting a first portion of the chunks in the data object with the client private key;
   sending the first portion of the chunks in the data object encrypted with the client private key to the server to store;
   encrypting a second portion of the chunks in the data object with a shared key to generate an encrypted second portion of the chunks;
   determining an identifier from the encrypted second portion of the chunks;
   using the determined identifier to determine whether the second portion of the chunks are stored in the server;

sending the encrypted second portion of the chunks to the server in response to determining that the second portion of chunks are not stored in the server; and sending an identifier for each of the chunks in the second portion of the chunks in the data object in response to determining that the second portion of the chunks are already stored at the server.

2. The method of claim 1, wherein the second portion comprises the chunks not in the first portion.

3. The method of claim 1, wherein the first portion of the chunks comprises a first chunk in the data object, and wherein the second portion of the chunks includes chunks in the data object following the first chunk.

4. The method of claim 1, further comprising:
receiving from the server an identifier;
encrypting the identifier with the client private key to produce an encrypted identifier; and
transmitting the encrypted identifier to the server.

5. The method of claim 4, wherein further comprising:
sending a request to restore the data object to the server;
receiving the encrypted identifier from the server in response to the request to restore;
decrypting the encrypted identifier with the client private key to produce a decrypted identifier;
transmitting the decrypted identifier to the server; and
receiving the second portion of the chunks from the server in response to the server receiving the decrypted identifier.

6. The method of claim 1, further comprising:
using a digest of each chunk in the data object to identify the chunks at the client and the server, wherein the digest is calculated from the chunk encrypted with the shared key or the client private key.

7. The method of claim 1, further comprising:
using a digest of each chunk in the data object to identify the chunks at the client and the server, wherein the digest is calculated from the chunk encrypted with the shared key or the client private key.

8. A method, comprising:
maintaining in a computer readable storage medium information on data objects from multiple clients, wherein each of the clients has a unique client private key, wherein each of the data objects includes a first portion of the chunks encrypted with the client private key of the client which originated the data object and a second portion of the chunks not encrypted with the client private key, and wherein at least two of the data objects from at least two of the clients include at least one common chunk in the second portions of the chunks of the at least two data objects;
storing only one copy of the at least one common chunk included in the second portions of the chunks of the at least two data objects;
receiving indication of a data object comprising a plurality of chunks to store for the client in a storage;
receiving a first portion of the chunks in the data object encrypted with a client private key;
receiving a second portion of the chunks in the data object encrypted with a shared key when a server does not currently store the second portion of the chunks;
receiving an identifier of the second portion of the chunks when the server currently stores the second portion of the chunks; and
storing the received first and second portions of the chunks for the data object.

9. The method of claim 8, wherein the first portion of the chunks comprises a first chunk in the data object, and wherein the second portion of the chunks includes chunks in the data object following the first chunk.

10. The method of claim 8, further comprising:
generating an identifier to store for the client;
transmitting the identifier to the client;
receiving an encrypted identifier from the client comprising the identifier encrypted with the client private key; and
associating the encrypted identifier and the identifier with the data object.

11. The method of claim 10, further comprising:
receiving a request to restore the data object from the client;
sending the encrypted identifier to the client;
receiving a response from the client including a purported unencrypted identifier;
determining whether the purported unencrypted identifier matches the identifier associated with the data object; and
transmitting to the client the second portion of the chunks in the data object to restore in response to determining that the purported unencrypted identifier matches the identifier associated with the data object.

12. The method of claim 11, further comprising:
sending to the client the first portion of the chunks encrypted with the client private key before receiving the response from the client including the purported unencrypted identifier.

* * * * *